United States Patent [19]
Scozzafava

[11] 3,842,620
[45] Oct. 22, 1974

[54] TORQUE TRANSMISSION DEVICE

[75] Inventor: Milton V. Scozzafava, Rowland Heights, Calif.

[73] Assignee: Addmaster Corporation, San Gabriel, Calif.

[22] Filed: Oct. 29, 1973

[21] Appl. No.: 410,961

[52] U.S. Cl................... 64/30 C, 64/30 A, 64/27 C, 64/15 C, 188/83, 192/65
[51] Int. Cl............................................... F16d 7/02
[58] Field of Search...... 64/30 R, 30 A, 30 E, 30 C, 64/27 R, 27 C, 1 SC, 1 SR; 188/83; 192/65

[56] References Cited
UNITED STATES PATENTS

| | | | |
|---|---|---|---|
| 1,442,417 | 1/1923 | Truebe | 64/30 C |
| 2,554,346 | 5/1951 | Reid | 188/83 |
| 2,665,079 | 1/1954 | Lippert | 64/30 R |
| 2,816,455 | 12/1957 | Hammond | 188/83 |
| 3,096,101 | 7/1913 | Raddenan | 188/83 |

Primary Examiner—Samuel Scott
Assistant Examiner—Randell Heald

[57] ABSTRACT

An inexpensive torque transmission device is provided which is applicable as either a brake or a clutch and comprises a conical friction element axially slidable between two relatively rotatable members. The element has a friction surface engageable with one of the members and a toroidal tension spring is tensioned between its conical face and the other of the members to exert a yieldable force urging the element into frictional engagement with the first member thereby transmitting a predetermined torque between the two members. The spring also reduces any tendency for the friction element to rotate relative to the second member.

8 Claims, 2 Drawing Figures

TORQUE TRANSMISSION DEVICE

BACKGROUND OF THE INVENTION

1. Field of the Invention

This invention relates to torque transmission devices for exerting a predetermined torque between two relatively rotatable members.

2. Description of the Prior Art

Transmission devices of the above type have been used for a large number of applications, operating as either friction brakes or friction clutches to transmit a predetermined torque. One such application is the use of a friction brake to apply a drag on a printing spool from which the ribbon is unwound. Generally, the device should provide as consistent a torque as possible in order to maintain a substantially even tension on the unwound portion of the ribbon. It should also be adjustable to accomodate different loads and yet be simple, compact and inexpensive as possible.

Although prior devices of the above type have been generally satisfactory, they provide certain problems which have not been overcome heretofore. For example, friction brakes or clutches of simple and inexpensive construction have generally been found to be erratic and inconsistent in their torque transmission characteristics while others which have more consistent torque characteristics have necessarily been more expensive to manufacture. Others have been found to be bulky and difficult to adjust.

SUMMARY OF THE INVENTION

The present invention provides a torque transmission device which may be used for a wide variety of applications, either as a friction brake or friction clutch and is therefore not limited to use in connection with a printing ribbon spool. The device comprises a friction element having a friction surface engageable with one of two relatively rotatable members. The element is supported for sliding movement between the members and has a conical surface facing the other member. An expansible tension spring is tensioned between the conical surface and such other member to provide a constant pressure between the friction surfaces. The device comprises a relatively few number of parts and is compact and inexpensive to manufacture and assemble. Also, the device may be easily adjusted to provide different torque characteristics by shortening the spring or stretching the spring.

It therefore becomes a principle object of the present invention to provide a torque transmission device having a more consistent torque and which is free from sticking or other erratic action.

Another object of the invention is to provide a simple and inexpensive torque transmission device which yet can be adjusted to provide different torque characteristics.

Another object is to provide a torque transmission device which is compact and lends itself to use in connection with a printing ribbon.

BRIEF DESCRIPTION OF THE DRAWINGS

The manner in which the above and other objects are accomplished will be readily understood in reference to the following specification when read in conjunction with the drawings, wherein.

DESCRIPTION OF THE PREFERRED EMBODIMENT

Figure 1:
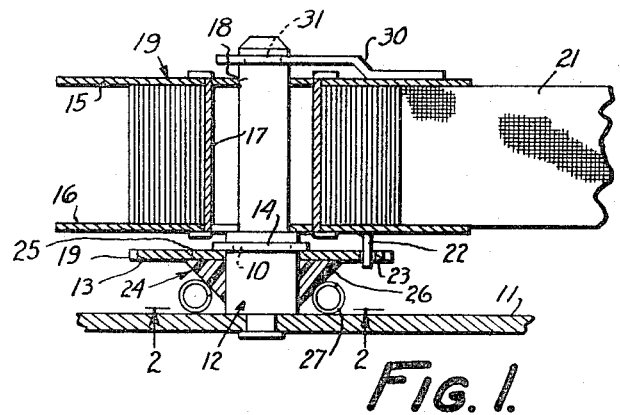
FIG. 1 is a cross sectional view of a printing ribbon spool support and friction brake embodying a preferred form of the present invention.
Figure 2:
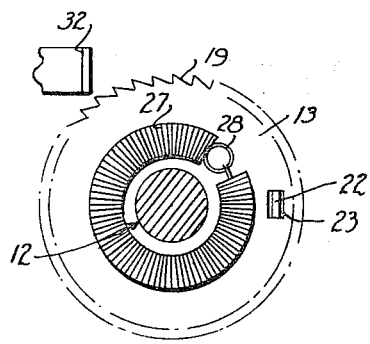
FIG. 2 is a transverse sectional view taken along the line 2—2 of FIG. 1.

Referring to the drawing, a sheet metal frame member 11 is shown which forms part of the frame of a typewriter or data printer (not shown).

A cylindrical bearing post 12 is riveted to the frame member 11 and extends at right angles thereto. A ratchet member 13 having ratchet teeth 19 formed around the periphery thereof is rotatably mounted on the post 12 and is retained thereon by a spring clip 14 held in a groove 10 in the post.

A ribbon spool generally indicated at 19, comprising two flanges 15 and 16 held in spaced relation to each other by a hub 17, is rotatably mounted on a reduced portion 18 of the post 12 and is retained thereon by a suitable retainer 30 which engages in a second groove 31 in the post 12.

An inked printing ribbon 21 is wrapped around the hub 17 of spool 19 and extends to a similar spool (not shown) which is spaced from the spool 19.

The spool flange 16 has a finger 22 extending therefrom which extends into an opening 23 formed in the ratchet wheel 13 to constitute a driving connection between the spool and the ratchet wheel.

According to the present invention, a friction element 24 is rotatably and slidably mounted on the post 12. The element is preferably formed of plastic, such as that known under the trademark "Delrin", although other materials having different coefficients of friction may be substituted to obtain different torque characteristics. The latter has a friction surface 25 which is frictionally engageable with the mating, under-surface of the ratchet wheel 25. The element 24 also has a conical surface 26 which faces the member 11, and a toroidal spring 27 is tensioned around the conical surface and engages the upper surface of frame member 11. Due to its tension, spring 27 tends to contract and thus exerts a wedging action between the element 24 and the frame member 11 to urge the element 24 along the post 12 and into frictional engagement with the ratchet wheel 13.

The conical surface 26 preferably extends at an angle of 45° to the axis of post 12, although such angle may be changed to correspondingly change the torque characteristics of the device. Also, such surface 26 could be made somewhat convex or concave and still perform its intended function.

The spring 27 is preferably of the helically wound wire type formed with end loops 28 which are connected together to form a toroid.

The tension of the spring 27 determines the torque characteristics of the device and maybe readily changed by either stretching the spring to lengthen the same or by cutting off one or more of the coils thereof to shorten the same.

Due to the multiplicity of coils of the spring 27 which engage both the conical surface 26 and the upper surface of the frame member 11, high pressure contact points are formed between the spring and the members 11 and 24 which prevent relative rotation between the element 24 and member 11 and thus obviates the necessity of forming a keyed connection between the element 24 and post 12 to prevent such rotation.

The spool 14 is alternatively driven as a takeup spool for winding the ribbon thereon. For this purpose, a pawl 32 is provided which is reciprocated at certain times to engage the teeth 19 of the ratchet wheel 13 to incrementally advance the spool 14 and thus wind the ribbon thereon.

I claim:

1. A torque transmission device comprising
a pair of spaced members relatively rotatable about an axis,
a friction element engageable with a first one of said members,
said element having an at least substantially conical surface facing the other of said members,
means forming a slide bearing supporting said element for movement toward and away from said first member, and
an toroidal spring member tensioned over and surrounding said conical surface and engaging said other member whereby to urge said friction element into frictional engagement with said first member.

2. A torque transmission device as defined in claim 1 wherein said spring member comprises a helically wound wire tension spring.

3. A torque transmission device as defined in claim 1 wherein said means comprises a cylindrical post rotatably supporting at least one of said members for movement about said axis.

4. A torque transmission device comprising
a pair of spaced members,
means on one of said members forming a bearing,
the other of said members being rotatably supported by said bearing,
a friction element intermediate said members,
said element having an at least substantially conical surface extending concentric with the axis of said bearing and facing the other of said members, and an expansible toroidal spring member tensioned over surrounding said conical surface and engaging said other member whereby to urge said friction element into frictional engagement with said first member.

5. A torque transmission device as defined in claim 1 wherein said friction element is slidably supported by said bearing 6. A torque transmission device as defined in claim 5 wherein said conical surface extends concentric with said axis of said bearing.

7. A torque transmission device comprising
a pair of spaced members having parallel facing surfaces, means on one of said members forming a bearing having an axis extending perpendicular to said surfaces,
said bearing rotatably supporting the other of said members,
a friction element having a surface frictionally engageable with a first one of said facing surfaces,
said element having an at least substantially conical surface facing the other of said facing surfaces, and an expansible toroidal spring member tensioned over and surrounding said conical surface and engaging said other facing surface whereby to urge said friction element into frictional engagement with said first facing surface.

8. A printing ribbon spool support comprising
a support member,
a bearing member carried by said support member,
a ratchet wheel rotatably supported by said beainr member,
a ribbon spool rotatably supported by said bearing member,
means operatively connecting said spool to said ratchet wheel,
a conical friction element intermediate said member and said ratchet wheel,
said friction element being slidably supported by said bearing member,
said friction element having a frictional surface engageable with said ratchet wheel, and
an expansible toroidal spring member tensioned over and surrounding said conical surface and engaging said support member whereby to urge said friction element into frictional engagement with said ratchet wheel.

* * * * *